July 29, 1924.
H. G. WARD
1,502,893
STREET INDICATOR FOR PASSENGER VEHICLES
Filed Sept. 23, 1922
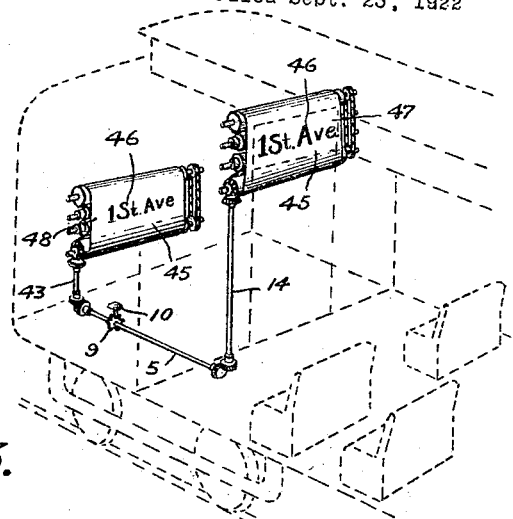
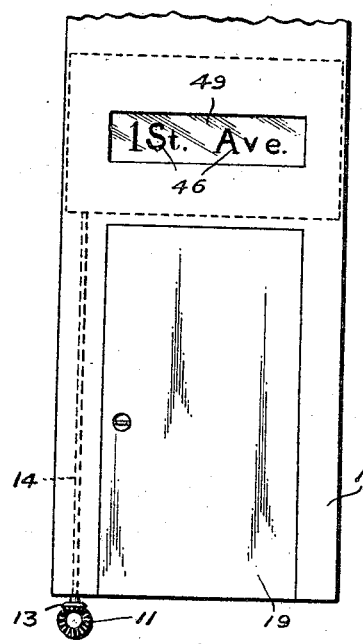
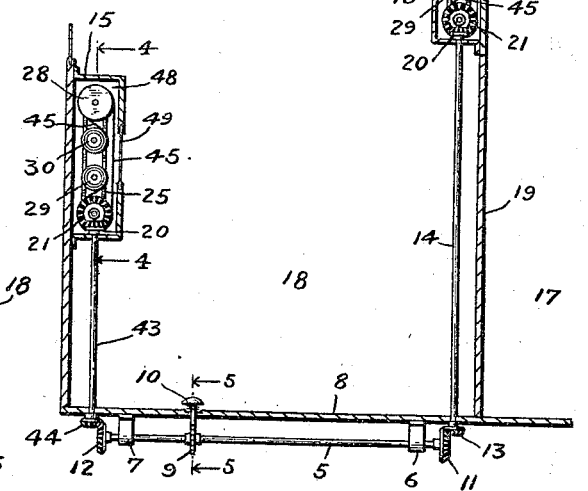
INVENTOR
*Harris G. Ward*
BY
*John W. Maupin,*
ATTORNEY Patented July 29, 1924.

1,502,893

UNITED STATES PATENT OFFICE.

HARRIS G. WARD, OF SEATTLE, WASHINGTON.

STREET INDICATOR FOR PASSENGER VEHICLES.

Application filed September 23, 1922. Serial No. 590,029.

*To all whom it may concern:*

Be it known that I, HARRIS G. WARD, a citizen of the United States, residing at Seattle, in the county of King and State of Washington, have invented a new and useful Street Indicator for Passenger Vehicles, of which the following is a specification.

This invention relates to improvements in street indicators for passenger vehicles and the principal object of the invention is to provide a street indicator which may be conveniently operated by the motorman or driver by a foot button to indicate each successive street or other locality of the vehicle by shifting a roll on which the names of said streets are printed and plainly visible to the passengers on said vehicle.

Another object is to provide a tell-tale indicator for the convenience of the motorman which is operated simultaneously and in synchronism with the passenger indicator and by means of which said motorman is continually informed as to the street or localities which are displayed within the passenger compartment.

A further object is to provide simple means for reversing the cycle of operations, as for instance on the return trip after having reached the end of the line.

Other objects are to provide a street indicator which is simple and durable in construction, reliable and efficient in operation, and which may be manufactured and installed at comparatively small cost.

With the above and other objects in view which will appear as the description proceeds, the invention consists of the novel construction, adaptation, arrangement and combination of parts hereinafter described and claimed.

These objects are accomplished by devices illustrated in the accompanying drawings, wherein—

Figure 1 is a view in perspective showing the skeleton arrangement of the device in its relative position within a street car as partly indicated in dotted lines;

Fig. 2 is a view showing portions of a street car in vertical section and showing the device in side elevation;

Fig. 3 is a view in front elevation of Fig. 2;

Fig. 4 is an enlarged view in vertical section taken on a broken line 4, 4 of Fig. 2; and Fig. 5 is an enlarged view in vertical section taken on a broken line 5, 5 of Fig. 2.

Referring to the drawings, throughout which like reference numerals designate like parts, the numeral 5 designates a horizontal shaft which is ordinarily suspended in bearings 6 and 7 beneath a flooring 8 of a passenger vehicle. A ratchet wheel 9 is secured to said shaft at a convenient location for the foot of the operator and a pawl 10, which serves as a foot button, is mounted in a hole through the flooring 8 to engage said ratchet wheel.

A bevel gear 11 is secured to the rear end of the shaft 5 and a similar gear 12 is secured to its forward end. In the mesh with the gear 11 is a smaller bevel gear 13 secured to the lower end of a relatively long vertical shaft 14. Said vertical shaft extends upwardly through the flooring 8 and through a casing 15 mounted on a partition 16 which ordinarily divides the passenger compartment indicated at 17 from the motorman's forward compartment 18 with a door 19 communicating therebetween.

A gear wheel 20, fixed to the upper end of the shaft 14, meshes with a gear 21 formed on the end of a friction roller 22 which is provided with an axle 23 revolvably mounted within the casing 15. A sprocket wheel 24 is secured on said axle opposite the gear 21 from which a sprocket chain 25 leads to a corresponding sprocket wheel 26 secured to an axle 27 revolvably mounted in the casing 15 and carrying a friction roller 28.

Mounted between the rollers 22 and 28 are hollow spring tension rollers 29 and 30 having stub spindles 31 and 32 fixedly secured to their ends revolvably mounted in the casing 15. Tension springs 33 ad 34, mounted within said rollers and extending substantially the full length thereof, are respectively secured thereto at one of their ends as at 35 and 36. The opposite ends of said springs are secured at 37 and 38 to spindles 39 and 40 extending rotatively through holes in the ends of said rollers and having square ends 41 and 42 mounted in said casing to prevent them from turning.

A relatively short vertical shaft 43, having a bevel gear 44 on its lower end in mesh with the gear 12, extends upwardly through the flooring 8 and into a casing 15 mounted on the forward wall of the motorman's compartment 18. Said casing is arranged to house a tell-tale indicator comprising mechanism which is identical in every detail with the mechanism housed in the corresponding casing 15 previously described. For this reason like reference numerals are used to designate the corresponding elements of both indicators and no further description of said tell-tale indicator is considered necessary except to state that the indicator mechanism actuated by the shaft serves to inform the passengers of the street localities while the indicator actuated by the shaft 43 informs the motorman for reasons more fully hereinafter described.

Corresponding rolls 45 of suitable material are carried by each of said indicators having the names of each street or other locality as indicated at 46 printed thereon in spaced apart synchronous relation. Said material is passed over the rollers 22 and 28 and its end portions are wound about the spring rollers 29 and 30 in such manner that sufficient tension will be exerted to prevent any slack and will keep said material stretched over said rollers at all times with enough pressure to prevent slipping.

While the passenger indicator, designated as a whole by the numeral 47, is shown in the drawings to be the same size as the motorman's tell-tale indicator 48, in practice said tell-tale indicator is to be relatively much smaller, it being understood that the gearing is always designed to cause the same street or other locality, as viewed through a window 49 by the motorman to be the same, as displayed to the passengers as viewed through a window 50 from the compartment 17.

In the operation of the device, it is merely necessary to press the foot on the head of the pawl 10 and it will be obvious that motion will be communicated from the horizontal shaft 5 through the vertical shafts 14 and 43 to both indicators 48 and 49 alike causing the same street to be displayed to the passengers as to the motorman who is thus continually informed both as to the locality of his car and to the locality displayed to the passengers without having to call out the names of said streets.

The head of the pawl 10 is ordinarily spaced a sufficient distance above the flooring 8 so that one operation will turn the mechanism the proper distance to bring the next street on display and this, of course, may be accomplished by various means using ratchet and pawls which differ from the one shown. When the vehicle reaches the end of the line the movement of the display roll is reversed by reversing the pawl as shown in dotted lines in Fig. 5 and thus causing the mechanism to turn backwards.

Although not shown in the drawings, it will be understood that provision is made for demounting the various rollers from the casing and also for fastening the ends of the materials 45 to the tension rollers 29 and 30.

The device may be collaterally used as an advertising medium and the value of this analogous usage will be apparent in displaying the advertisements of places of business at the time the vehicle is in the vicinity of the particular business places displayed.

Having thus described my invention what I claim and desire to secure by Letters Patent is:—

A street indicator for passenger vehicles comprising a casing adapted for observation by the passengers of said vehicle, a corresponding casing arranged for observation by the operator, spring tension rollers mounted in both of said casings adjacent the central portions thereof, friction rollers revolvably mounted in the upper and lower portions of each of said casings, sprocket means connecting said rollers, a flexible material disposed over said friction rollers and its end portions wound on said tension rollers in each of said casings, said materials having the names of localities designated thereon in spaced apart relation, gears on the ends of each of said lower friction rollers, vertical shafts in mesh with said gears, a horizontal shaft gearedly connecting said vertical shafts, means for actuating said horizontal shaft to cause said flexible materials in each of said casings to synchronously move a predetermined distance, and means for reversing the movement of said flexible materials.

HARRIS G. WARD.